Oct. 21, 1924.
I. V. EDGERTON
POULTRY CAR
Filed April 9, 1924
1,512,215
3 Sheets-Sheet 1
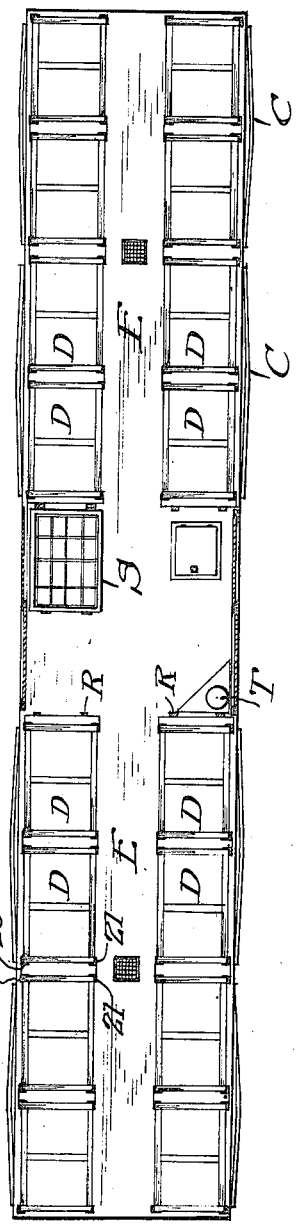
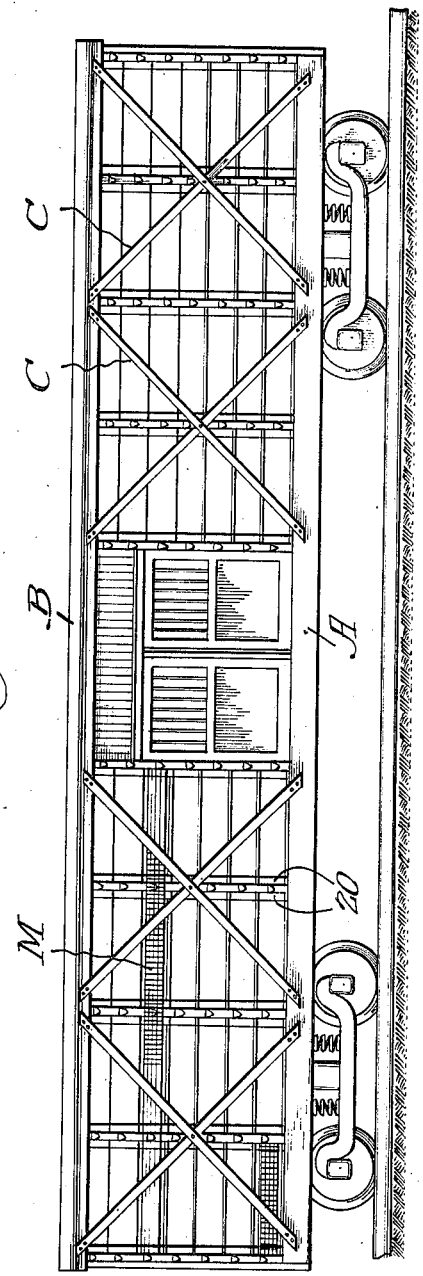
Inventor:
Israel V. Edgerton
By Fisher, Fowle, Clapp & Soans
Att'ys

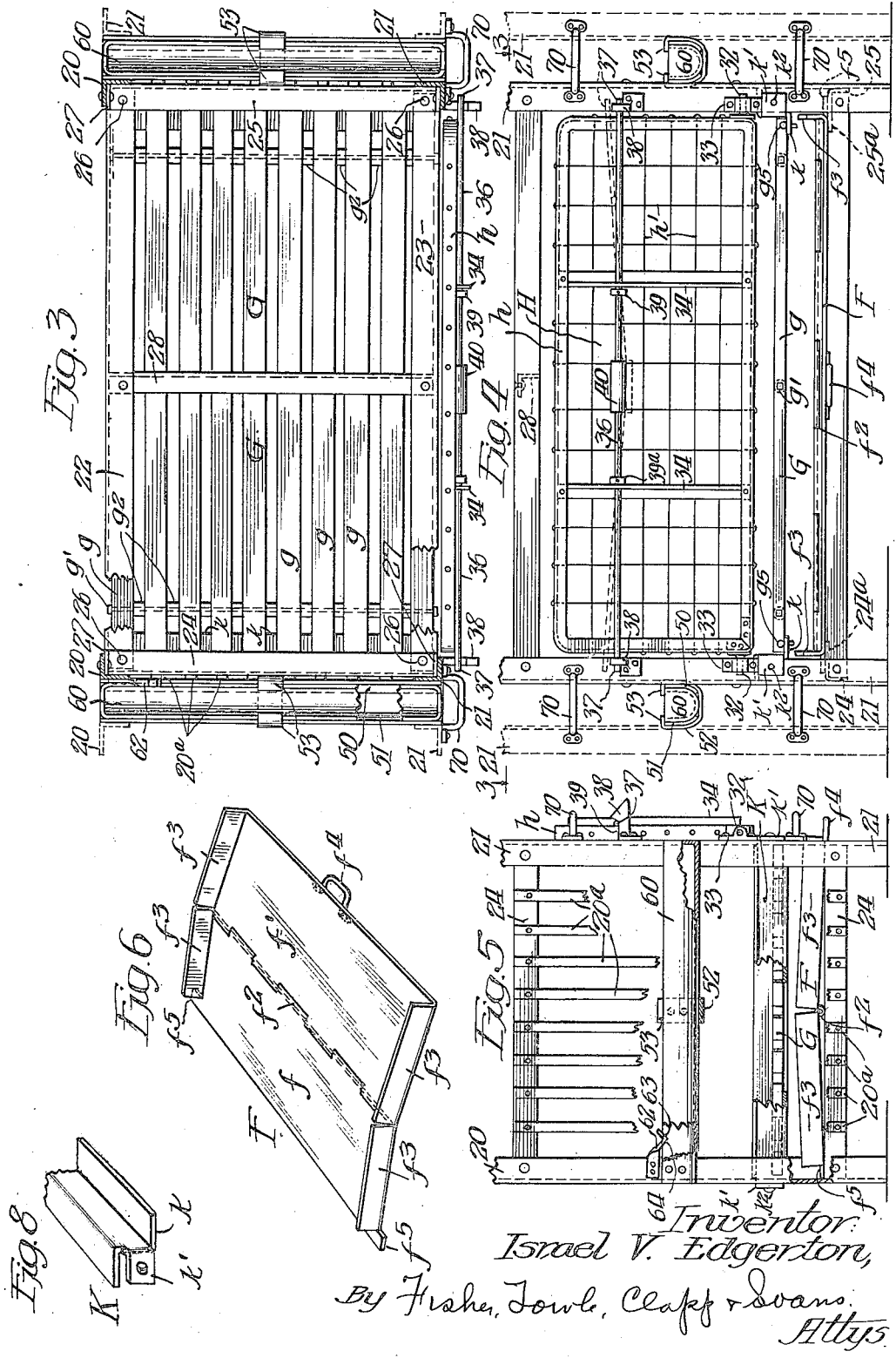

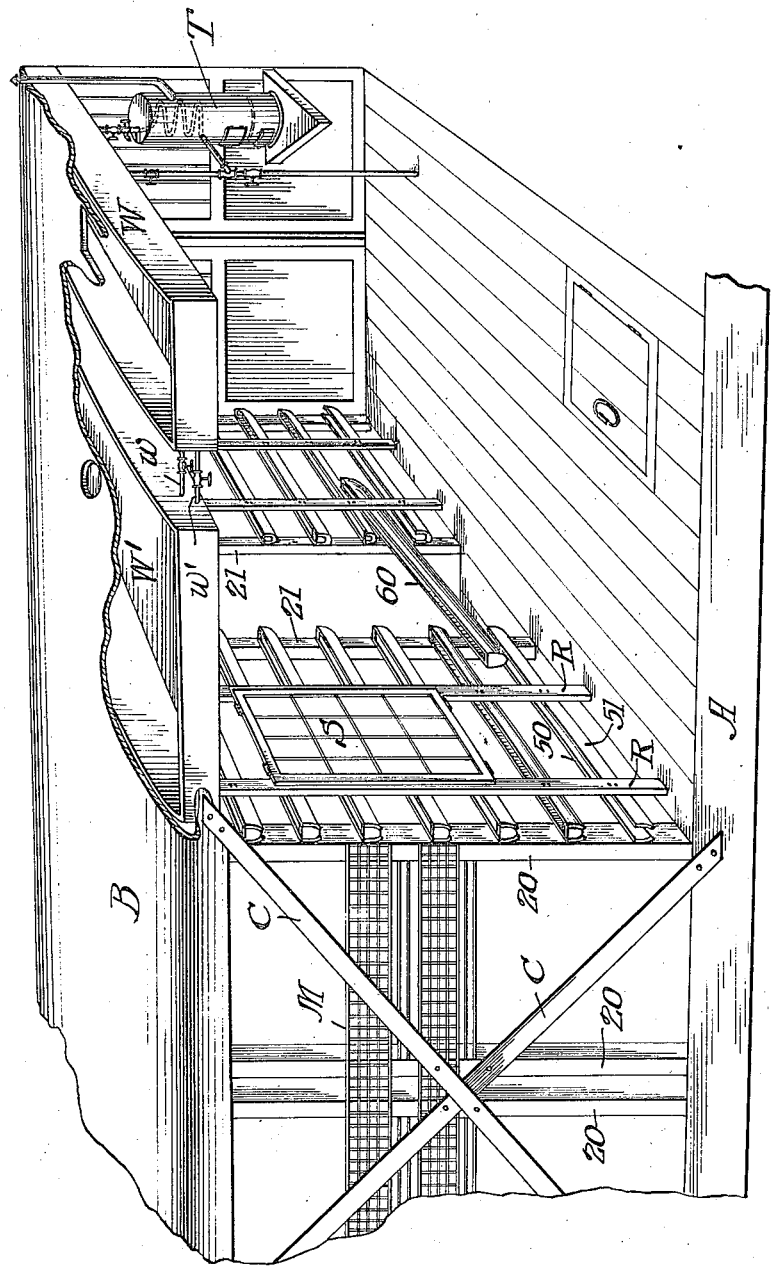

Patented Oct. 21, 1924.

1,512,215

UNITED STATES PATENT OFFICE.

ISRAEL V. EDGERTON, OF CHICAGO, ILLINOIS.

POULTRY CAR.

Application filed April 9, 1924. Serial No. 705,173.

*To all whom it may concern:*

Be it known that I, ISRAEL V. EDGERTON, a citizen of the United States, residing at Chicago, in the county of Cook and State of Illinois, have invented certain new and useful Improvements in Poultry Cars, of which I do declare the following to be a full, clear, and exact description, reference being had to the accompanying drawings, forming a part of this specification.

The present invention has relation to that class of cars more particularly designed for the transportation of live poultry and the invention consists in the features of novelty hereinafter described, illustrated in the accompanying drawings and particularly pointed out in the claims at the end of this specification.

In the transportation of live poultry, it is of great importance that the coops or compartments wherein the fowls are confined shall be so disposed that light and air shall be admitted to the compartments to the greatest possible extent. It is very important also that the troughs by which feed is delivered to the fowls shall be so arranged not only that the fowls may have ready access thereto, but also that the food within the troughs shall be subjected to the greatest possible exposure to light and air in order to retain the food in wholesome condition. One of the main objects of the present invention is to provide a poultry car in which the compartments for inclosing the fowls shall be so spaced apart that a thorough circulation of air on all sides of the compartments may be had, the spaces between the compartments being of such character as to adapt them to receive the feed troughs in manner permitting a free exposure of said troughs to light and to a circulation of air, while at the same time holding the troughs in such position that the food contained therein may not be contaminated by droppings from the compartments.

A still further object of the invention is to provide an improved construction of feed troughs and means for removably holding said troughs in position between the superposed compartments.

Another object of the invention is to provide improved door locking mechanism for the individual compartments.

Other features of the invention will appear from the following specification and from the claims at the end thereof.

Fig. 1 is a diagrammatical plan showing the arrangements of the batteries or tiers of compartments in a car embodying my invention.

Fig. 2 is a side elevation of the car.

Fig. 3 is an enlarged view in horizontal section on line 3—3 of Fig. 4, through one of the batteries or tiers of compartments.

Fig. 4 is a view in front elevation from the aisle of the car of the lowermost compartment of one of the tiers or batteries.

Fig. 5 is an end view of the compartment shown in Fig. 4.

Fig. 6 is a perspective view of one of the floor plates.

Fig. 7 is a perspective view showing portions of the car body and some of the parts contained therein, various parts being omitted.

Fig. 8 is a detail perspective view of one of the Z-shaped bars for supporting the floor.

The body of the car may be of any suitable or approved construction, comprising a lower or floor portion A and a roof portion B suitably supported on the floor portion, braces C being preferably disposed along the sides of the car, as indicated in Figs. 1 and 2 of the drawings. The end walls of the car may be of usual construction.

The individual compartments or coops wherein the fowls are confined are arranged in batteries or tiers D that are disposed upon opposite sides of the longitudinal aisle or passageway E. Each of the batteries is shown as composed of four vertical corner posts 20 and 21 that are preferably made of angle iron, as shown in Fig. 3 of the drawings. The corner posts 20 are arranged adjacent the outer wall of the car, while the corner posts 21 of each battery are arranged adjacent the longitudinal aisle E of the car. The corner posts of each battery are connected by a plurality of bars 22, 23, 24 and 25, the bars 22 extending between the outer corner posts 20, the bars 23 extending between the inner or aisle corner posts 21 and the bars 24 and 25 extending between the corner posts 20 and 21. The ends of the bars 22, 23, 24 and 25 are riveted together as at 26 and the angular ends 27 of the bars 24 are riveted to the corner posts 20 and 21, as shown in Fig. 3 of the drawings. Suitable vertical slats or bars 20$^a$ attached to the cross bars 24 and 25 serve to form open end walls for the various compartments (see Fig. 5). The outer sides of the compartments are closed in the usual manner as by lattice-work M, as indicated in Fig. 2 of the drawings. The groups of bars 22, 23, 24 and 25 correspond in number to the number of superposed compartments or coops in each battery or tier. The upper flanges $24^a$ and $25^a$ of the angle bars 24 and 25 extend inwardly slightly beyond the inturned flanges of the corner posts 21 so as to support the floor plates F. Each of these floor plates is preferably formed of sections $f$ and $f'$ hinged together as at $f^2$ and preferably the ends of the floor plates are formed with upturned flanges $f^3$ to prevent the droppings passing over the end of the floor plates. Adjacent its front edge, the floor plate F is preferably formed with a handle $f^4$ to permit the plate to be readily withdrawn into the aisle E when the plate is to be cleaned. At its rear edge, the floor plate F is shown as provided with protecting lugs $f^5$ which will contact with the corner posts 21 and prevent the complete withdrawal of the floor plates and thus avoid the danger of their being misplaced or carried away.

It will be seen that by forming the floor plates F of hinged sections, the plates can be readily withdrawn into the aisle E while the attendant is standing in the aisle, the section of the floor plate $f'$ adjacent the aisle dropping so as to discharge the material thereon without contacting with the attendant.

Above each of the floor plates F is preferably arranged a supplemental floor G that consists of a slatted or open-work structure of wood or metal. As shown, this supplemental floor G is formed of longitudinal slats $g$ that are united by tie-rods $g'$, suitable spacing washers $g^2$ being interposed between the slats $g$. To support the supplemental floor G, I preferably employ Z-shaped bars K, the lower horizontal flanges $k$ of these bars extending inwardly beneath the ends of the floor G, as seen in Figs. 3 and 4 of the drawings, and the outer ends $k'$ of the vertical flanges of the Z-shaped bars being bent laterally, as shown in Figs. 4 and 5, to permit them to be riveted as at $k^2$ to the corner posts 20 and 21. When the supplemental floor G is used, the droppings from the fowls will pass therethrough onto the floor plate F. It will be seen that bars K not only serve to support the floor G, but these bars also serve to prevent any droppings passing over the ends of the floor and into the feed troughs, as will hereinafter more fully appear.

Cotter pins $g^5$ passing through openings in the horizontal flanges of the bars K adjacent their ends will serve to prevent the accidental withdrawal of the floor G.

The front of each compartment is shown as closed by a suitable vertically swinging door or gate H that may be formed of a bent angle bar $h$ between which extends cross wires $h'$ suitably connected thereto in ordinary manner. At the lower corner of each gate is a projecting stud or pintle 32 that is held within a pintle socket 33 that is riveted to the front flange of the adjacent aisle corner post 21. Across the gate H extend the vertical bars 34 the ends of which are riveted to the border bar $h$. In these bars 34 are formed openings through which passes a flexible rod or latch bar 36 the ends 37 of which project a slight distance in front of the corner post 21 and engage with beveled lugs 38 that are riveted to the corner posts 21. In the tops of the latch lugs 38 are formed seats 39 into which the ends 37 of the latch bar 36 will drop when the gate or door is in closed position, as shown in Figs. 3 to 5 of the drawings. Through the latch bar or rod 36 and adjacent the bars 34 are passed pins which serve to hold washers $39^a$ rigidly upon the bar 36, these washers serving to prevent the longitudinal movement of the bar 36. The bar 36 is a steel rod and preferably about its center has secured thereto a handle 40 by which the bar may be depressed when it is desired to lift the ends 37 of the bar to disengage them from the notches 39 of the latch lugs 38. From this construction, it will be seen that when the ends 37 of the bar 36 are in engagement with the latch lugs 38, the gate or door H will be securely held in closed position, but when the attendant grasping the handle 40, depresses the central portion of the rod 36, the free ends 37 of the rod will be raised out of the seats 39 of the latch lugs 38 so that the door or gate can be swung forwardly and downwardly. When the door or gate is to be closed, the ends 37 of the latch bar 36 will ride over the inclined latch lugs 38 until the ends of the latch bar 36 engage the seats 39 of the lugs.

The lower ends of the vertical posts 20 and 21 of the tiers of compartments will be securely fastened to the floor or under part of the car body in any convenient manner. Each tier of compartments is spaced at a distance from the next adjoining tier of compartments, the spaces between the tiers of compartments being sufficient to permit feed troughs to be carried therein. These spaces between the tiers of compartments will be open and unobstructed, except for the troughs and their supports, as the floors of the individual compartments do not extend across these spaces. Preferably, I sustain the feed troughs between the tiers of compartments by providing opposite the adjacent ends of each pair of compartments a shell or casing that is shown as comprising two metal plates 50 and 51 that are riveted to the upright posts 20 and 21. The lower portions of these metal plates 50 and 51 are curved and approximate each other at their bottoms but are spaced apart so as to permit any overflow from the troughs to drop down to the trough below. About midway of the casing plates 50 and 51 passes a strap iron 52 the upper ends of which are turned inwardly as at 53 over the top edges of the plates 50 and 51, and the function of these inturned ends 53 is to prevent the rocking or turning of the trough within the casing, as will presently more fully appear. These feed troughs 60 are of sheet metal and are of substantially the same length as the casing plates 50 and 51, whereby they are supported. It will be noticed that as a trough 60 is placed in position for use within its respective casing, the upper edges of the trough will slide beneath the inwardly turned ends 53 of the band 52 that extends about the casing plates 50 and 51 and the trough will thus be guarded against any turning movement that might tend to accidentally discharge its contents.

To prevent the accidental withdrawal of the troughs 60 from the supports 50, I prefer to provide for each trough a suitable latch adapted to engage the trough after it has been placed in position for use. As shown, this latch may consist of a spring metal bar 62 one end of which is riveted (see Fig. 5) to a corner post 20, while its free end is formed with an inclined angular part 63 adapted to engage a notch or seat 64 formed in the edge of the trough 60 adjacent its inner end. It will be seen that the inclined free end of the latch 62 will permit the trough to be slipped beneath the latch while the angular portion 63 of the latch will drop into the notch 64 of the trough, when the trough is in position for use.

By arranging the batteries or tiers of compartments D with spaces between them adapted to receive the feed troughs, these spaces being unobstructed by the car floors, not only is a free circulation of air allowed all around the compartments, but the troughs are subjected to a much greater exposure to light and circulation of air than would be possible if the floors of the compartments extended above the troughs and this greater exposure of the troughs to light and air more effectively serves to preserve the food within the troughs in wholesome condition.

In my improved poultry car, as in poultry cars of prior constructions, the compartments D are usually about 43 inches deep (i. e., tranversely of the car), and about 12 to 14 inches high, while the aisle E of the car is usually only about 25 inches wide, this arrangement being such as to give the greatest possible depth to the compartments for accommodation of the poultry. With such prior constructions, it is impossible to satisfactorily withdraw the feed troughs completely from the compartments because such troughs are necessarily of greater length than the width of the aisle between the compartments. With my present construction, however, inasmuch as the spaces between the tiers of compartments are arranged opposite each other, as shown in Fig. 1, and are open at the aisle, a trough when withdrawn from between compartments at one side of the car, may have its inner end passed into the space between the corresponding compartments at the opposite side of the car and thus the easy and complete withdrawal of the feed trough is made possible, thereby permitting the troughs to be more readily and thoroughly cleaned and refilled.

As indicated in Figs. 1 and 2 of the drawings, the tiers of compartments at the ends of the car will be located at such distance from the end walls of the cars as to form spaces for the insertion of feed troughs at such points. So also the ends of the tiers of compartments adjacent the central room or open space of the car will be provided with feed troughs as shown in Fig. 7 of the drawings. In order to sustain these feed troughs, as shown in Fig. 7, the trough supporting plates 51 will be carried by suitably disposed vertical bars R to which the plates 51 will be riveted. In Fig. 7, one of the troughs 60 is shown as withdrawn from its supports and with its inner end extending into the corresponding space at the opposite side of the center aisle.

If desired, a folding cot S, shown in Fig. 7, may be attached to the vertical bars R, this folding cot S being shown in Fig. 7 in upturned position.

In Fig. 7 I have also illustrated the means for heating the water that will be supplied to the various troughs of the car. This heating apparatus comprises a suitable heater T having a coil of pipe therein, this pipe communicating with an overhead water tank W. The tank W is for hot water and the water within this tank may be brought to any desired temperature by the heater T. The tank W is connected by circulating pipes $w$ and $w'$, with a cold water tank W', the pipes $w$ and $w'$ being fitted with stop cocks which will control the circulation of water between the tanks W and W'.

In order to gain access to the upper compartments of the car, it is customary for the attendant to step upon the gates of the lower compartments. This is objectionable, as it does not afford a suitable footing and the weight of the attendant upon the gates tends to break or distort the same. To avoid this, I propose to provide at the front of the lower compartments suitable steps or bars which will enable the attendant to easily reach the upper compartments of the car. As shown, these steps comprise bars 70 that extend between the aisle posts 21 of adjoining compartments, the ends of these bars or steps 70 being securely riveted to the front flanges of the aisle posts 21.

It will be understood that the details of construction above set forth may be followed without departing from the spirit of the invention and that the features of the invention may be employed without its adoption as an entirety.

I claim as my invention:

1. A poultry car comprising a plurality of tiers of superposed compartments arranged in alignment and having open end walls, the end walls of adjoining tiers being fixed at distances apart to afford spaces to receive feed troughs, said spaces being open at the side of the car and at the aisle of the car, and a plurality of feed troughs mounted in said spaces between the end walls of the compartments.

2. A poultry car comprising a plurality of tiers of superposed compartments arranged in alignment and having open end walls, the end walls of adjoining walls being fixed at distances apart to afford spaces to receive feed troughs and the floors of the compartments terminating at said end walls, said spaces being open at the side of the car, and a plurality of feed troughs mounted in said spaces between the end walls of the compartments.

3. A poultry car comprising a plurality of tiers of superposed compartments arranged in alignment and having open end walls, the end walls of adjoining tiers being fixed at distances apart to afford spaces to receive feed troughs, and feed troughs and supports for the same within said spaces, said spaces being open at the side of the car and at the aisle of the car and being unobstructed from top to bottom except for the feed troughs and their supporting means.

4. A poultry car having an aisle extending longitudinally thereof, a plurality of tiers of superposed compartments arranged in alignment on opposite sides of said aisle, the end walls of adjoining tiers being fixed at distances apart to form spaces, feed troughs movably mounted in said spaces, said spaces being open at the aisle of the car and the open spaces between adjoining tiers on each side of said aisle being disposed opposite the spaces between adjoining tiers at the opposite side of the aisle, whereby when feed troughs on one side are withdrawn, their ends may pass into the spaces between tiers at the opposite side of the aisle.

5. A poultry car comprising a plurality of unitary tiers of superposed compartments arranged in alignment, each tier having inner and outer corner posts with barriers between them and to form the open end walls of the compartments, the end walls and the supporting posts of adjoining tiers being fixed at distances apart to afford spaces to receive feed troughs, said spaces being open at the side of the car and at the aisle of the car, and a plurality of feed troughs movably mounted within said spaces.

6. A poultry car comprising a plurality of unitary tiers of superposed compartments arranged in alignment, each tier having inner and outer corner posts with barriers between them to form the open end walls of the compartments, the end walls and the supporting posts of adjoining tiers being fixed at distances apart to afford spaces to receive feed troughs, said spaces being open at the side of the car and at the aisle of the car, trough supports attached to the ends of the compartments, and feed troughs movably mounted on said supports.

7. A poultry car comprising a plurality of unitary tiers of superposed compartments arranged in alignment, each tier having inner and outer corner posts with barriers between them to form the open end walls of the compartments, the end walls and the supporting posts of adjoining tiers being fixed at distances apart to afford spaces to receive feed troughs, said spaces being open at the side of the car and at the aisle of the car, trough supports held within said spaces and comprising casings open at their bottoms, troughs movable within said supports, and spring latches for preventing the accidental withdrawal of the troughs.

8. A poultry car comprising a plurality of tiers of superposed compartments, vertically swinging doors for said compartments, catches fixed to the aisle ends of said tiers adjacent the sides of the doors, and a flexible rod mounted upon each of said doors in manner permitting the central part of said rod to be deflected to cause the ends of the rod to be moved into and out of engagement with said catches.

9. In a poultry car comprising a plurality of superposed compartments arranged upon opposite sides of a longitudinal aisle, a floor plate formed of hinged sections, said floor plate being mounted in manner permitting it to be withdrawn into the aisle of the car.

10. In a poultry car comprising a plurality of superposed compartments arranged upon opposite sides of a longitudinal aisle, a floor plate formed of hinged sections, said floor plate being mounted in manner permitting it to be withdrawn into the aisle of the car, the rear part of said floor plate being provided with means to prevent the complete withdrawal of the plate.

11. In a poultry car, the combination with a compartment for fowls and with troughs at the ends of said compartment, of a floor and upwardly projecting guards at the ends of said floor to prevent droppings passing into said troughs.

12. A poultry car having compartments on opposite sides of a longitudinal aisle, each compartment having a supplemental openwork floor whereon the fowls may stand, and a removable floor located beneath the supplemental openwork floor to catch the droppings passing therethrough and mounted to be drawn out into the aisle, said removable floor consisting of collapsibly connected sections which are free to be collapsed when drawn out into the aisle.

13. A poultry car having compartments on opposite sides of a longitudinal aisle, each compartment having a removable floor mounted to be drawn out into the aisle and consisting of collapsibly connected sections which are free to be collapsed when drawn out into the aisle.

14. In a poultry car, the combination with a compartment for fowls and with troughs at the ends of said compartment, of a floor, angle bars having flanges for supporting said floor in manner permitting said floor to be withdrawn, a removable floor plate beneath said floor and angle bars having flanges for supporting said floor plates.

ISRAEL V. EDGERTON.